United States Patent
Migozzi et al.

[11] Patent Number: 5,153,774
[45] Date of Patent: Oct. 6, 1992

[54] OPTIC DEVICE FOR THE INTRODUCTION OF A SUPERIMPOSED IMAGE INTO THE VISUAL FIELD OF AN OBSERVER

[75] Inventors: Jean-Blaise Migozzi, Orsay; Laurent Monnier, Bordeaux, both of France

[73] Assignee: Sextant Avionique, Meudon la Foret, France

[21] Appl. No.: 706,342

[22] Filed: May 28, 1991

[30] Foreign Application Priority Data

May 29, 1990 [FR] France .................. 90 06656

[51] Int. Cl.$^5$ .............................................. G02B 27/10
[52] U.S. Cl. ........................................ 359/633; 359/638
[58] Field of Search ............... 359/630, 633, 639, 629, 359/618, 638

[56] References Cited
U.S. PATENT DOCUMENTS 4,099,841 7/1978 Ellis ..................................... 359/639

FOREIGN PATENT DOCUMENTS 129821 1/1985 European Pat. Off. .
3032849 4/1982 Fed. Rep. of Germany .

Primary Examiner—Jon W. Henry
Attorney, Agent, or Firm—Oblon, Spivak, McClelland, Maier & Neustadt

[57] ABSTRACT

Disclosed is an optic device designed to enable an observer to look simultaneously at what is normally in his visual field and at a collimated image that is introduced so as to be superimposed on his visual field. The optic device has a plate with parallel faces in which the light rays coming from an image generator, through an access point, get propagated by total reflection on the parallel faces. A slab, formed by a stacking of plane mirrors, reconcentrates the light rays and directs them towards two successive, semi-reflecting mirrors which reflect them partially towards the observation pupil. The semi-reflecting mirrors are in the visual field of an observer's eye placed at the observation pupil.

4 Claims, 3 Drawing Sheets

OPTIC DEVICE FOR THE INTRODUCTION OF A SUPERIMPOSED IMAGE INTO THE VISUAL FIELD OF AN OBSERVER

BACKGROUND OF THE INVENTION

The present invention relates to an optic device that enables an observer to look at what is normally in his field of vision and, simultaneously, at a collimated image, through the introduction of this image into his visual field, using an image-combining optic system that includes at least one semi-reflecting mirror. It must be noted that, in this document, the term "collimated image" refers to an image formed at infinity: the fact of giving the observer a collimated image prevents him for having to adjust his eyesight in different ways when he focuses his attention on the outside view and when he focuses it on the image, thus averting eye fatigue.

Such optic devices exist. They ar used especially in aeronautics, for example to provide a pilot with piloting information without obliging him to take his eyes off the outside view.

Thus, the European patent No. 0077 193 describes a first optic device comprising a block of transparent material with two plane, parallel and polished faces and one input face, and a semi-reflecting spherical mirror within this block. This block is made so that an incident ray coming from an image generator, after going through the input face, undergoes a total reflection on one of the two parallel faces, then a partial reflection on the semi-reflecting mirror, then a refraction on that face of the two parallel faces on which it has already undergone a total reflection. The light rays coming from the scene to be viewed go through the optic block by the two parallel faces and the spherical mirror before reaching the observer's eye. This optic device has two drawbacks in particular: the transparent block is thick and, therefore, heavy and bulky, and the input face forms a mask that reduces the observer's visual field.

There is also a known way, disclosed in the French patent application No. 89 06721, of using an image generator and a sequence of parallel, semi-reflecting mirrors positioned in an optic waveguide and processed to be reflective at incidence values that get increasingly smaller with distance from the generator. The observer looks at the outside view by transparency through the semi-reflecting mirrors. This second optic device, which shall be represented by FIG. 1 appended hereto, has certain drawbacks. These drawbacks include, more especially, the fact that it has a pupil for the injection of images into the optic system that is about thirty millimeters high and is therefore too big, and that it is subject to parasitic reflections due to reflection on the edge of the optic waveguide.

SUMMARY OF THE INVENTION

It is an aim of the invention to prevent or, at least, to reduce the drawbacks of these known optic devices.

This is obtained by means of an optic device that uses substantially the same elements as those constituting the second optic device described hereabove, but does so in combining them differently and in modifying the structure of one of them so as to make it play a different role.

According to the invention, there is provided an optic device for the introduction of a superimposed image into the visual field of an observer looking through an observation pupil, said optic device comprising: a first transparent plate with two large, plane and parallel faces, a first end and a second end that are opposite to each other, positioned between the large faces, and a semi-reflecting mirror at equal distance from the two large faces, the first end being coupled to an image generator and the coupling being determined so as to ensure that the light rays coming from the generator get propagated in the plate by total reflection on the two large faces; a second transparent plate limited by two large plane faces positioned respectively in the prolongation of the two large faces of the first plate and by edges, having one end, positioned between the two large faces of the second plate and n semi-reflecting, plane beam splitters, where n is a whole number greater than 1, said beam splitters being parallel, placed between the two large faces of the second plate, inclined with respect to these two large faces and positioned in the observer's visual field; and a concentration slab formed by a stack of plane mirrors, these mirrors having their surfaces perpendicular to the large faces, the stack of mirrors having a first side in contact with the second end of the first plate and a second side opposite to the first side, in contact with the end of the second plate, so as to provide for an optic coupling between the two ends with which this stack of mirrors is in contact, such that the light rays coming from the generator go through the slab after an odd number of reflections and reach the beam splitters where they get reflected, at least partially, towards the observation pupil.

BRIEF DESCRIPTION OF THE DRAWINGS

The present invention will be understood more clearly and other features shall appear from the following description and from the appended drawings, of which.

MORE DETAILED DESCRIPTION

Figure 1:
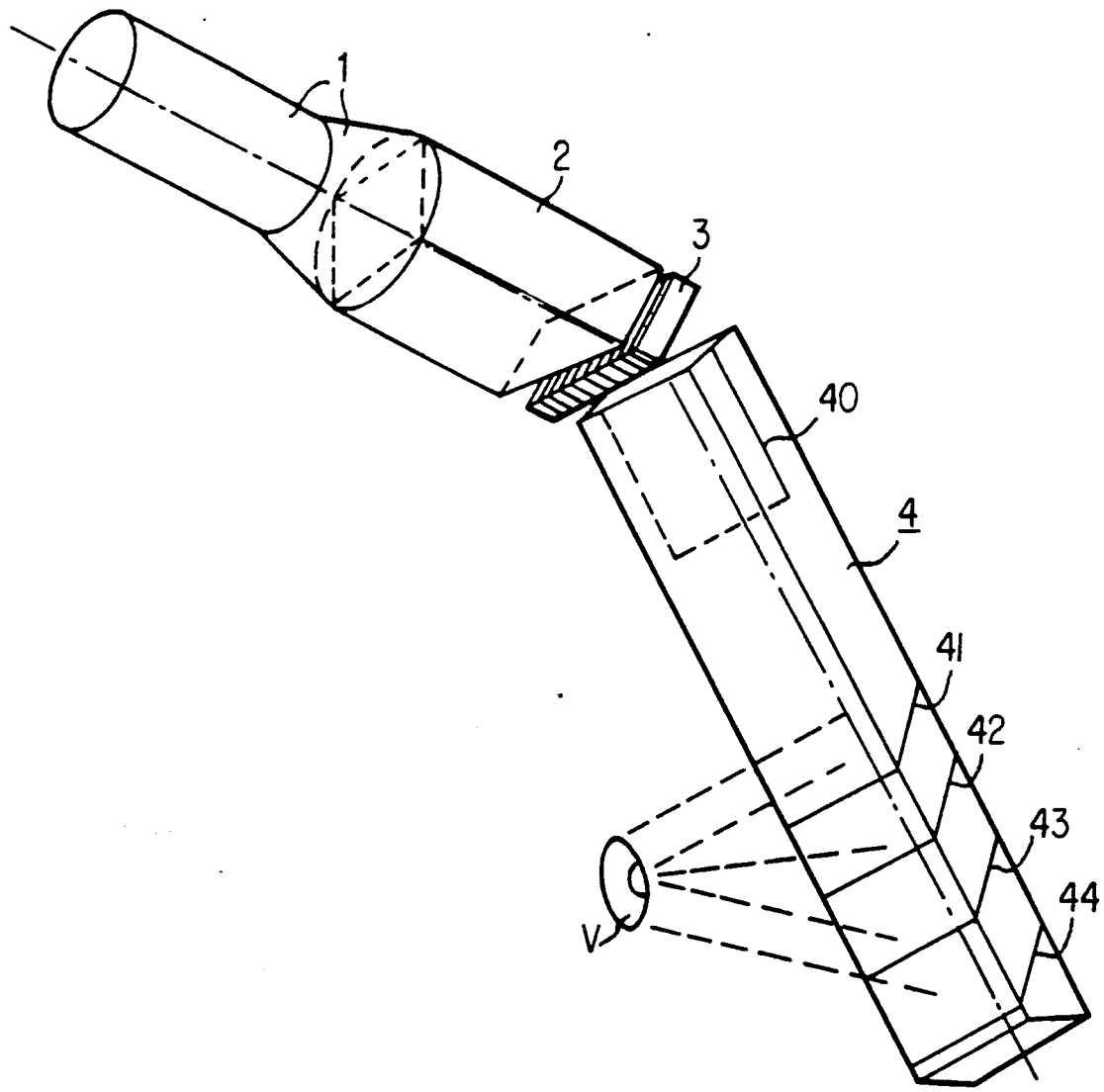
FIG. 1 shows an optic device according to the prior art.

FIG. 1 shows a schematic top view of a prior art optic device as positioned in relation to an observer. The observer's left eye alone, designated V, is shown in the figure. Another similar device, designed for the right eye, has not been shown. Nor does the figure show the helmet, worn by the observer, to which the two optic devices are fixed.

The optic device according to FIG. 1 has an image generator 1 provided with a cathode-ray tube 1, an optic collimation element 2 to place the image generated by the cathode-ray tube screen at infinity, a symmetrization slab 3 formed by a stacking, at constant pitch, of rectangular mirrors all having the same dimensions, and a transparent plate 4 that has inclusions 40 to 44, one of which, 40, is at equal distance from the two large parallel faces of the plate 4 while the other inclusions, which are parallel to one another and slanted with respect to the two large faces, are called beam splitters.

The beam splitters 41 to 44 each have a semi-reflecting mirror and the eye V can look simultaneously at the outside scene by transparency through the beam splitters 41 and 44 and at the image produced by the image generator 1, by reflection on the beam splitters 41 to 44. The plate 4 is a rectangular-sectioned thin plate with parallel faces, the two large faces of which are inclined by 15° with respect to the vertical when the observer's head is inclined neither upwards nor downwards. Correlatively, the optic axis of the optic collimation element and that of the cathode-ray tube, which lie in the prolongation of each other, are inclined by 50° upwards. Furthermore, the main axis of the optic waveguide, constituted by the plate 4, forms an angle of 135° with the optic axis of the optic collimation element. The working of the optic device of FIG. 1 may be summarized as follows: the image generator 1 gives an image on the screen of its cathode-ray tube. The optic collimation element forms an image thereof at infinity. The symmetrization slab 3, which is an optic element for division into equal parts, creates an image that is symmetrical with respect to a horizontal plane. The first inclusion 40 uniformly distributes the rays of one and the same field on the beam splitters 41 to 44. The beam splitters 41 to 44 reflect the different fields selectively to form an observation pupil at a distance from the device. In this observation pupil, the observer's eye can perceive both the image given by the generator 1 and the scene placed before him.

In this known optic device, the symmetrization slab and the use of the reflection on the edge of the plate 4 or, more precisely, on the small, upper face of the plate 4, enable the height of the optic collimation device to be reduced by half. However, as indicated at the beginning of this document, this optic device has drawbacks that the device according to the invention makes it possible to avoid or, at least, to mitigate.

Figure 2:
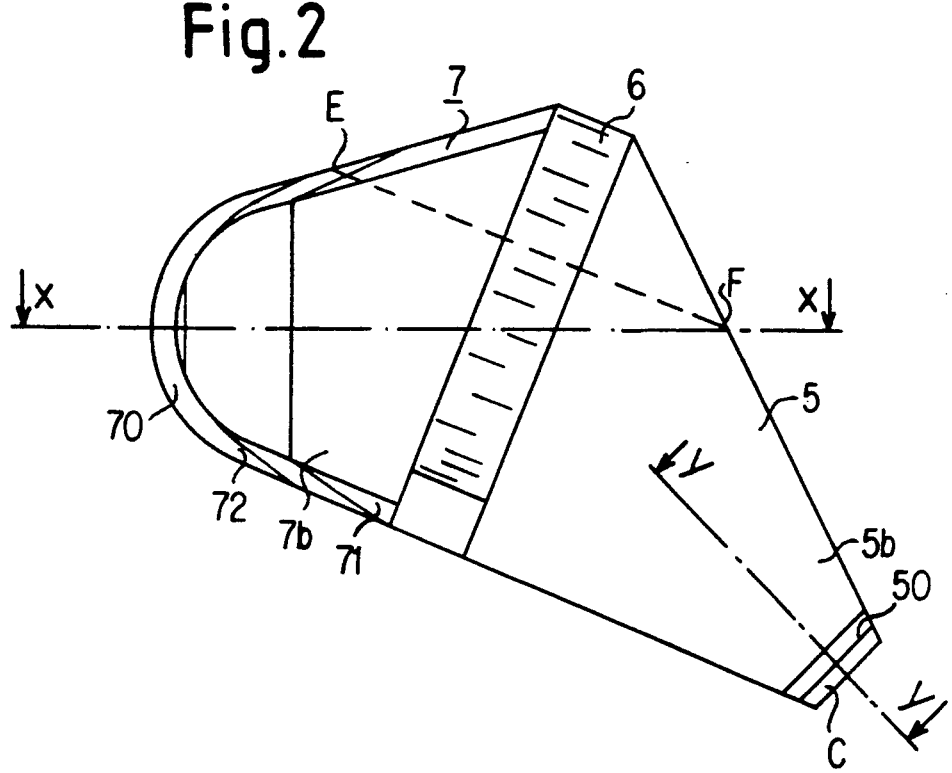
FIG. 2 shows a top view of an optic device according to the invention.

FIG. 2 shows a view, seen from the side on which an observer's eye is placed, of an optic device for the introduction of a superimposed image into the visual field of an observer. In FIG. 2, two axial lines XX and YY show the traces of two sectional planes corresponding to two sectional views drawn respectively according to FIGS. 3 and 4.

Figure 3:
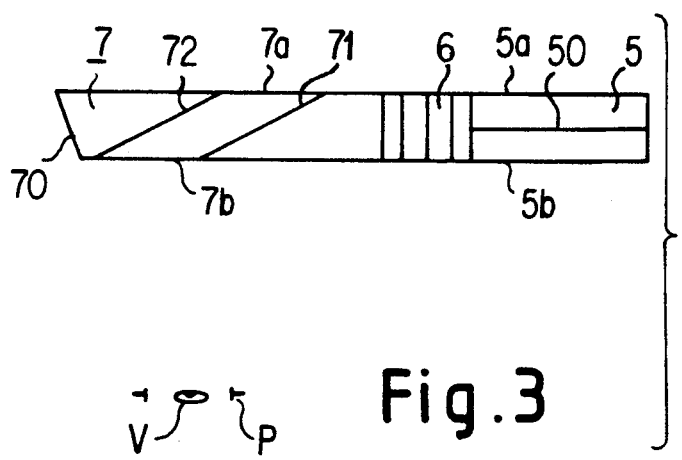
FIGS. 3 and 4 show sectional views of the optic device according to FIG. 2.
Figure 4:
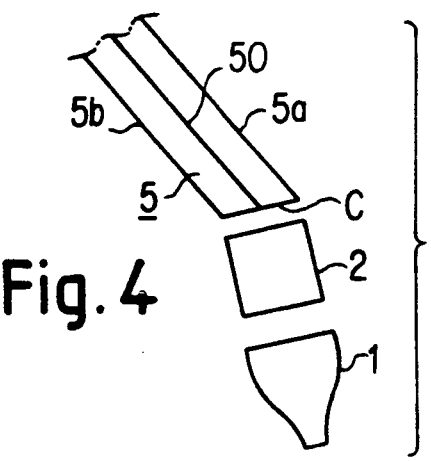

The optic device according to FIGS. 2, 3 and 4 has a first transparent plate 5, optically coupled to a second transparent plate 7 by a concentration slab 6, formed by a stack of reflecting mirrors, each mirror being constituted by an 8 mm by 10 mm rectangle. The plate 5 has two large parallel faces 5a and 5b at a distance of 8 mm from each other. The plate 7 also has two large parallel faces 7a and 7b that are respectively in the same planes as the faces 5a and 5b.

A cathode-ray tube 1, shown in FIG. 4, followed by an optic collimation element 2, also shown in figure 4, gives a collimated image, i.e. an image formed at infinity. The rays of this image penetrate the plate 5 by an end C that is inclined by 55° with respect to the large faces 5a and 5b. At mid-distance from its two large faces, the plate 5 has a semi-reflecting mirror 50.

The two large parallel faces of the plate 5 take the form of pseudo right-angled triangles, one acute angle of which is truncated by a straight cut corresponding to the end C, used as an access for the collimated image, while the side opposite this truncated angle forms an end opposite the end C and is in contact with one of the sides of the slab 6.

The mirrors constituting the slab 6 have their face perpendicular to the large faces of the plate 6 and to the side opposite the truncated angle in the pseudo-triangles of the faces 5a, 5b. The light that comes from the optic collimation element 2 goes through the slab 6 after an odd number of reflections as shall be seen from FIG. 6, and then penetrates the plate 7.

The two large faces of the plate 7 also take the form of pseudo right-angled triangles, one acute angle of which is truncated by a cut in the form of an arc of a circle, while the side opposite the truncated angle corresponds to on end of the plate 7 in contact with the slab 6. It is through this end that the light of the collimated image penetrates the plate 7 after having gone through the plate 5 and the slab 6.

As can be seen in FIGS. 2 and 3, those edges of the plate 7 that are not in contact with the slab are chamfered. Thus, these edges produce no mask in the visual field of an eye V of the observer placed at the observation pupil P of the optic device. The eye V and the observation pupil are drawn in FIG. 3: they are on the face 7b side, at about 27 mm from this face, vertical to the center of the arcs of circles that truncate the pseudo-triangles of the faces 7a, 7b.

The plate 7 has two beam splitters 71, 72 constituted by semi-reflecting mirrors, the reflection index of which is 30%. These beam splitters are inclined by 27° with respect to the large faces 7a, 7b of the plate 7 and are at a distance of 6.9 mm from each other.

The working of the different parts of the optic device that has just been described is explained here below.

The transmission of light in the plate 5 is done with total reflections on the two large faces 5a and 5b.

The semi-reflecting mirror 50 enables the beam splitters 71, 72 to be touched by all the rays, irrespectively of their incidence, coming from the image generator 1 through the optic collimation element 2. The mirror 50 therefore has the same role as the mirror 40 according to FIG. 1.

Figure 5:
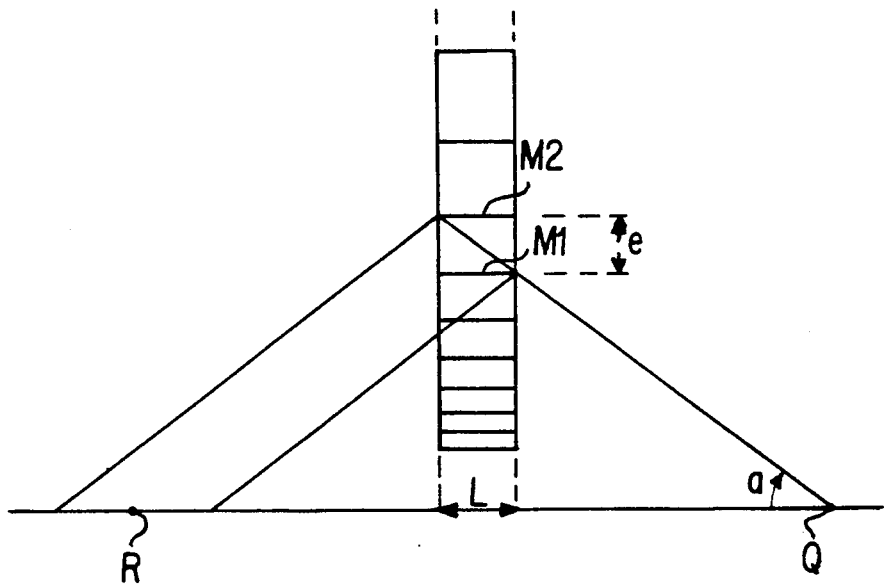
FIG. 5 shows a detailed view of one of the constituent elements of the optic device according to FIG. 2.

The concentration slab 6 is used to reconcentrate the rays coming from the optic collimation element towards the observation pupil. The ray transmitted by the optic collimation element go through the slab where they undergo an odd number of reflections before going towards the observation pupil P. FIG. 5 shows how, for a single reflection in the slab and at a constant slab width L, the variable pitch e between the mirrors of the slab should be determined. The figure shows the points Q and R which are the central points of the output of the optic collimation element and the observation pupil as seen from the slab 6. The straight line QR is perpendicular to the large dimensions of the slab 6 and, for there to be only one reflection of the rays coming from M to two successive mirrors M1, M2 of the slab, it is necessary to have:

$$e = L \cdot \tan a$$

where a is the angle made by QR with the ray coming from Q and reaching the mirror M2 after having glanced against the mirror M1, and e is the distance between M1 and M2.

It may be useful to reconcentrate the rays coming from the optic collimation element by making them undergo an odd number (greater than 1) of reflections in the slab 6. This indeed enables the pitch e, between the successive mirrors, to be reduced when it gets too big, and thus enables the diameter of the injection pupil to be reduced.

The above formula can thus be written, more generally, as follows:

$$e = L \cdot \tan a / (2k + 1)$$

where 2k+1 is the number of reflections between two successive mirrors of the slab with k as a whole number greater than −1.

The list given in the paragraph here below indicates the values of e in the exemplary embodiment according to FIGS. 2 to 5. It must be noted that from the twelfth pitch onwards, there are three reflections between two successive mirrors whereas there was one previously.

In the pairs of numbers given hereinafter, the first number corresponds to the order of the pitch taken from that closest to the line PQ while the second number corresponds to the value of this pitch in millimeters:

1-1; 2-1; 3-1; 4-1; 5-1; 6-1.05; 7-1.26; 8-1.51; 9-1.8; 10-2.16; 11-2.59; 12-1.04; 13-1.1; 14-1.17; 15-1.26; 16-1.33; 17-1.42; 18-1.52; 19-1.61; 20-1.72; 21-1.84; 22-1.95; 23-2.09; 24-2.22; 25-2.37; 26-2.52; 27-2.52; 28-2.52.

In the formula:

$$e = L \tan a/(2k+1)$$

a and k are the variants for the slab just referred to.

Figure 6:
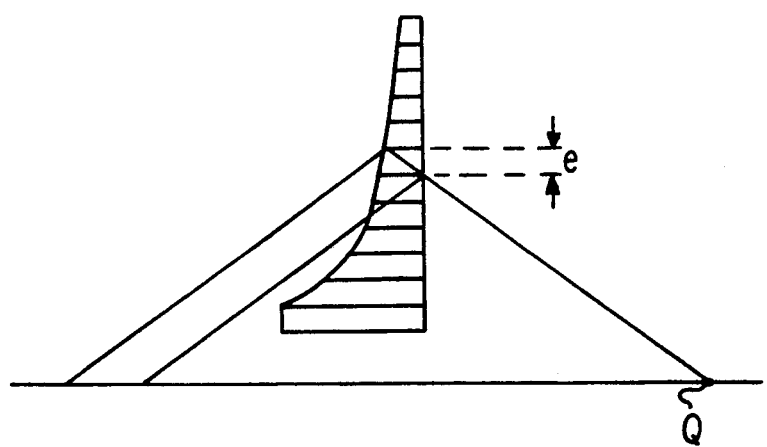
FIG. 6 shows a view of an alternative embodiment of the element according to FIG. 5.

A slab for an optic device according to the invention may also be designed with a constant pitch and a variable slab width, or even a variable number of reflections in the slab. FIG. 6 is a drawing that illustrates a variant such as this. It must be noted that, in the embodiment according to FIG. 6, the side by which the light penetrates the slab is not straight and the side of the plate 5, which is in contact with the slab and matches its shape, is not straight either.

The slab 5 according to FIGS. 2, 3 and 5 as well as the slab according to FIG. 6 are used, as seen above, to reconcentrate the rays coming from the optic collimation element towards the observation pupil. It therefore has a role totally different from that of the slab 3 according to FIG. 1, since this slab 3 is used, for its part, to create a second symmetrized image with the eye sometimes observing the direct image, for the bottom field, and sometimes observing the indirect image, for the top field.

After having gone through the slab 6, the light coming from the optic collimation element penetrates the plate 7, where it is reflected towards the eye through beam splitters constituted by the semi-reflecting mirrors 71, 72. By transmission, these beam splitters also enable the observer to see the external scene located on the other side of the plate 7, so much so that, in his field of vision, the observer has the external image with the superimposed collimated image.

Owing to its reduced dimensions, the optic device described with the help of FIG. 2 and the following figures requires only two image-combining, semi-reflecting mirrors 71, 72 in the plate 7. Consequently, the mirrors 71, 72 do not need to be treated so as to be selective in incidence as is the case with the embodiment according to FIG. 1 where the losses of light on the successive beam splitters are such that, without such treatment, the image seen from the eye and coming from the optic collimation element would be appreciably more luminous in its part given by the beam splitter 41 than in its part given by the beam splitter 44.

The present invention is not limited to the examples described or mentioned here above. Thus, in particular, the thicknesses, angles and shapes may be modified as a function of the conditions of use and of the dimensions of the optic collimation device. Furthermore, by carrying out a reflection on the edge, by means of a mirror whose plane is perpendicular to the plane of FIG. 2 and goes through the straight line segment EF drawn in this figure, the optic device described with reference to FIG. 2 may be reduced on its entire part located above this straight-line segment.

What is claimed is:

1. An optic device for the introduction of a superimposed image into the visual field of an observer looking through an observation pupil, said optic device comprising:
    a first transparent plate with two large, plane and parallel faces and having a first end and a second end that are opposite to each other, a semi-reflecting mirror being located between the two large faces of the first transparent plate, wherein the first end is coupled to an image generator and the coupling is determined to ensure that light rays generated from the image generator are propagated in the first transparent plate by total reflection on the two large faces;
    a second transparent plate limited by two large plane faces and having a first end and a second end, a plurality of reflecting plane beam splitters located between the two large faces of the second transparent plate, wherein said beam splitters are parallel, inclined with respect to the two large faces of the second transparent plate and positioned in the observer's visual field; and
    a concentration slab formed by a stack of plane mirrors having reflective surfaces perpendicular to the large faces of the first and second transparent plates, the stack of mirrors having a first side in contact with the second end of the first transparent plate and a second side, opposite to the first side, in contact with the first end of the second transparent plate, so as to provide for an optic coupling between the second end of the first transparent plate and the first end of the second transparent plate with which this stack of mirrors is in contact, such that the light rays coming from the image generator pass through the concentration slab, undergo an odd number of reflections in the concentration slab, and reach the beam splitters where they are at least partially reflected toward the observation pupil.

2. An optic device according to claim 1, wherein the beam splitters are two in number.

3. An optic device according to claim 1, wherein the second transparent plate has chamfered edges.

4. The optic device according to claim 1, wherein the two large plane faces of the second transparent plate are respectively in the same planes as the two large plane faces of the first transparent plate.

* * * * *